(12) United States Patent
Pip

(10) Patent No.: US 8,709,608 B2
(45) Date of Patent: Apr. 29, 2014

(54) ELASTIC POLYPROPYLENE-BASED FILM COMPOSITIONS

(75) Inventor: Hans J. Pip, Overijse (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 461 days.

(21) Appl. No.: 12/809,529

(22) PCT Filed: Jan. 24, 2008

(86) PCT No.: PCT/US2008/051847
§ 371 (c)(1),
(2), (4) Date: Apr. 18, 2011

(87) PCT Pub. No.: WO2009/094027
PCT Pub. Date: Jul. 30, 2009

(65) Prior Publication Data
US 2011/0189495 A1   Aug. 4, 2011

(51) Int. Cl.
| | |
|---|---|
| *B32B 27/00* | (2006.01) |
| *B32B 27/06* | (2006.01) |
| *C08L 31/04* | (2006.01) |
| *C08K 5/00* | (2006.01) |

(52) U.S. Cl.
USPC ............ 428/483; 428/500; 524/222; 524/524

(58) Field of Classification Search
None
See application file for complete search history.

(56) References Cited

U.S. PATENT DOCUMENTS

| | | | |
|---|---|---|---|
| 5,691,034 A | 11/1997 | Krueger et al. | |
| 5,888,615 A * | 3/1999 | Mascarenhas et al. | ....... 428/141 |
| 6,500,563 B1 | 12/2002 | Datta et al. | |
| 6,881,800 B2 | 4/2005 | Friedersdorf | |
| 6,992,158 B2 | 1/2006 | Datta et al. | |
| 2004/0236042 A1 | 11/2004 | Datta et al. | |

FOREIGN PATENT DOCUMENTS

| | | |
|---|---|---|
| WO | WO 00/01745 | 1/2000 |
| WO | WO 02/36651 | 5/2002 |
| WO | WO 2006/113132 | 10/2006 |
| WO | WO 2007/115816 | 10/2007 |

OTHER PUBLICATIONS

Cheng, H. N., "$^{13}$C NMR Analysis of Ethylene-Propylene Rubbers," Macromolecules, vol. 17, pp. 1950-1955 (1984).

Ver Strate et al., "Near Monodisperse Ethylene-Propylene Copolymers by Direct Ziegler-Natta Polymerization. Preparation, Characterization, Properties," Macromolecules, vol. 21, pp. 3360-3371 (1988).

Cazes, J. Ed., "On Line Determination by Light Scattering of Mechanical Degradation in the GPC Process," Liquid Chromatography of Polymers and Related Materials III, pp. 207-234, (Marcel Dekker, 1981).

* cited by examiner

*Primary Examiner* — Sheeba Ahmed

(57) ABSTRACT

Disclosed in part is a composition comprising one or more propylene-α-olefin copolymer(s) comprising propylene-derived units and from 5 to 35 wt % (by weight of the propylene-α-olefin copolymer) of ethylene-derived units and/or $C_4$ to $C_{10}$ α-olefin-derived units, and having a Mooney viscosity [ML (1+4) @ 125° C.] as determined according to ASTM D1646, of less than 50, and a $H_f$ of less than 75 J/g; and one or more ethylene-ester copolymer(s). The composition is suitable for an elastic film, and in particular suitable for a two or more layered film wherein the skin (outer) layer also includes anti-block and slip agents.

23 Claims, No Drawings

ELASTIC POLYPROPYLENE-BASED FILM COMPOSITIONS

CROSS-REFERENCE TO RELATED APPLICATIONS

This application is a 371 National Stage Application of International Application No. PCT/US2008/051847, filed Jan. 24, 2008, the disclosures of which are incorporated herein by reference in their entirety.

FIELD OF THE INVENTION

The present invention relates to compositions useful for making elastic films, and in particular to propylene-based compositions useful for making blown films of high elasticity.

BACKGROUND OF THE INVENTION

Elastic films are used in many applications such as in absorbent articles where strength and elasticity are needed. Ethylene plastomers are commonly used to produce elastic films. However, producing such ethylene-based elastic films is difficult, as the films can be tacky, can break easily during extrusion, and have limited elasticity. Polypropylene would be a better alternative in this regard, but low comonomer (less than about 8 wt % comonomer) polypropylene does not have the desired elasticity, and high comonomer polypropylene (greater than about 40 wt % comonomer, such as EP rubber) is not usable for conventional film extrusion as it needs to be crosslinked and would result in a film with a high level of gels, and also cannot be recycled. Other materials such as styrenic block copolymers and thermoplastic polyurethanes can be used to make elastic films; they offer excellent elasticity but they are relatively expensive and thus undesirable for products that are ultimately intended to be disposable.

It is known that certain polypropylene copolymers, having a mid-range of comonomer content (between about 5 to 25 wt % comonomer), a 0.5 to 40% level of crystallinity, and triad tacticity (of three propylene units) of 75% or greater have a desirable amount of elasticity as well as low cost. However, these propylene-α-olefins copolymers alone can be too tacky for practical use, and also lack bubble stability for making blown films. What would be desirable is a propylene-based composition suitable for making blown films having the advantageous low cost and elasticity of these propylene-based polymers, but also having improved bubble stability and lower level of tackiness. The inventor has found useful propylene-α-olefin compositions for such films.

SUMMARY OF THE INVENTION

Thus, disclosed in one aspect is a composition, suitable for a film of one or more layers in another aspect, comprising one or more propylene-α-olefin copolymer(s) comprising propylene-derived units and from 5 to 35 wt % (by weight of the propylene-α-olefin copolymer(s)) of ethylene-derived units and/or $C_4$ to $C_{10}$ α-olefin-derived units, and having a Mooney viscosity [ML (1+4) @ 125° C.] as determined according to ASTM D1646, of less than 50, and a $H_f$ of less than 75 J/g; and one or more ethylene-ester copolymer(s). In one embodiment, the one or more propylene-α-olefin copolymer(s) is present in an amount of from 50 to 95 wt % by weight of the propylene-α-olefin copolymer(s) and ethylene-ester copolymer (e.g., ethylene vinyl-acetate). In another embodiment, the one or more propylene-α-olefin copolymer has a comonomer content within the range of from 2 to 20 wt % based on the weight of the propylene-α-olefin copolymer.

The propylene-α-olefin copolymer(s) can be characterized by many features. In one embodiment the one or more propylene-α-olefin copolymer has a $H_f$ of less than 70 J/g. In another embodiment the one or more propylene-α-olefin copolymer(s) has a Mooney viscosity [ML (1+4) @ 125° C.] as determined according to ASTM D1646, of less than 30. In yet another embodiment the one or more propylene-α-olefin copolymer(s) possesses an Elongation at Break within the range of less than 800 or 1000%.

The ethylene-ester copolymer(s) can also be characterized by certain features. In one embodiment the one or more ethylene-ester copolymer has a melt index (190° C./2.16 kg) within the range of from 0.05 to 10 dg/min. In yet another embodiment the one or more ethylene-ester copolymer has an ester-derived content within the range of from 5 to 30 wt % by weight of the ethylene-ester copolymer. And in yet another embodiment the ethylene-ester copolymer comprises ester-derived groups selected from structures $CH_2CR^1(R^2)$, wherein $R^1$ is selected from hydrogen and $C_1$ to $C_{10}$ alkyls; and $R^2$ is selected from $-OOCR^3$ groups and $-COOR^3$ groups; and wherein $R^3$ is selected from hydrogen and $C_1$ to $C_{10}$ alkyls.

The composition can be made into a film having one or more layers. Certain layers of the film, the outside "skin" layers in a preferred embodiment, comprise from 0.1 to 20 wt % of an anti-blocking agent, by weight of the composition. In one embodiment, the anti-blocking agent is an inorganic oxide. In yet another embodiment, the outside layer(s) comprise from 0.05 to 10 wt % of a slip agent, by weight of the composition used to make the layer of film. In one embodiment, the slip agent is an organic amide.

In yet another aspect of the invention is a film comprising one or more skin layer comprising the composition above that includes the anti-blocking and slip agents, wherein the film also comprises one or more middle layer comprising one or more propylene-α-olefin copolymer comprising propylene-derived units and from 5 to 35 wt % (by weight of the propylene-α-olefin copolymer(s)) of ethylene-derived units and/or $C_4$ to $C_{10}$ α-olefin-derived units, and having a Mooney viscosity [ML (1+4) @ 125° C.] as determined according to ASTM D1646, of less than 50, and a $T_m$ of less than 105° C.; and one or more ethylene-ester copolymer. In one embodiment, the film comprises at least two skin layers and one or more middle layer there between. In another embodiment, the multilayer film has a Permanent Set after Elongation to 200% (TD) of less than 40 or 50 or 60%. In yet another embodiment, the multilayer film has a static coefficient of friction of less than 0.40.

Insofar as certain numerical ranges of the features of the invention(s) are described, it is understood that any upper limit of that range can be combined with any lower limit of that range, as disclosed herein, to achieve a desirable range.

DETAILED DESCRIPTION OF THE INVENTION

Aspects of the present invention are related to propylene-based compositions suitable for films, especially blown films, and in particular, elastic films. In one embodiment, the invention relates to a film having a single layer, and relates to a film having two layers in another embodiment, and to a film having three layers in yet another embodiment, and relates to a film having more than three layers in yet another embodiment. When present, one or more layer(s) (layer "A") will comprise one or more ethylene-ester copolymer(s), one or more propylene-α-olefin copolymer(s), a slip agent and an anti-block agent; and will consist essentially of one or more ethylene-ester copolymer(s), one or more propylene-α-olefin copolymer(s), one or more slip agent(s) and one or more anti-block agent(s) in a particular embodiment. Typically, one or more additional layer(s) (layer "B") of the film will comprise one or more ethylene-ester copolymer(s) and one or more propylene-α-olefin copolymer(s); and will consist essentially of one or more ethylene-ester copolymer(s) and one or more propylene-α-olefin copolymer in a particular embodiment(s). Finally, the one or more additional layer(s) (layer "B") of the film will consist essentially of one ethylene-ester copolymer and one propylene-α-olefin copolymer in a more particular embodiment.

As used herein, the term "layer" is used to refer to each of the one or more compositions, the same or different, that are secured to one another in thin sheet or film-form by any appropriate means such as by an inherent tendency of the materials to adhere to one another, or by inducing the compositions to adhere as by a heating, radiative, chemical, or some other appropriate process. The term "layer" is not limited to detectable, discrete compositions contacting one another such that a distinct boundary exists between the compositions. Preferably however, the composition used to make one layer of a film will be different (i.e., the weight percent of components, the properties of each component, and/or the identity of the components may differ) from the composition used to make an adjacent layer, when present. The term "layer" includes a finished product having a continuum of compositions throughout its thickness. The "films" of the present invention comprise one or more layer, and may comprise two, three or more "layers."

Suitable structures include, for example "ABA", wherein a film having the "ABA" structure has three layers, a middle layer made from "B", and outer "A" layers on either face of "B". Non-limiting examples of other structures include "A" only, "B" only, AB, BAB, ABA, AAB, AABAA, BABB, ABAA, BBAB, BBAABB, ABABA, BABAB, AABBBA, and other variants comprising from 2 or 3 to 5 or 6 or 7 or 8 or more layers. In a particular embodiment, films of the present invention are of the AB and ABA type.

As used herein, "ethylene-ester copolymer" refers to a class of chemical compounds that is formed by the polymerization of ethylene and vinyl-acrylates or vinyl acetates (collectively, "ester" groups). More particularly, ethylene-ester copolymers comprise ester-derived groups selected from structures $CH_2CR^1(R^2)$, wherein $R^1$ is selected from hydrogen and $C_1$ to $C_{10}$ alkyls; and $R^2$ is selected from —$OOCR^3$ groups and —$COOR^3$ groups; and wherein $R^3$ is selected from hydrogen and $C_1$ to $C_{10}$ alkyls. The ethylene-ester copolymers described herein comprise from 2 or 4 to 40 wt % ester-derived units in one embodiment, and from 10 to 30 wt % in another embodiment, and from 12 to 26 wt % ester-derived units in yet another embodiment, based on the weight of the ethylene-ester copolymers.

Ethylene vinyl-acetate copolymer is a common vinyl acetate copolymer. Ethylene vinyl acetate copolymers ("EVA") are polymers of ethylene-derived units with acetate-derived groups randomly distributed throughout the chains. As the level of vinyl-acetate derived units in the copolymer increases, so the level of crystallinity found relative to the ethylene-derived units alone reduces from about 60% to 10%. This yields products ranging from materials similar to low density polythene to flexible rubbers. Common grades can contain from 2% to 50% vinyl acetate. Clarity, flexibility, toughness and solvent solubility increase with increasing vinyl-acetate derived units in the EVA.

Some examples of useful "acetate" groups incorporated into the ethylene-ester copolymers include acetate ($CH_3COO$—), propylate ($CH_3CH_2COO$—), butyrate, benzoate ($C_6H_5COO$—), monofluoracetate, cyclohexyl carboxylate, carbomethoxy (—$COOCH_3$), carboethoxy (—$COOC_2H_5$), carbopropoxy, etc. Typical moieties $CH_2CH$— may thus include, for example, vinyl acetate, vinyl propylate, vinyl benzoate, methyl acrylate, ethyl acrylate, methyl methacrylate (in which one of the hydrogens of the formula is replaced by the methyl group), ethyl acrylate, etc.

Ethylene methyl-acrylate copolymer is a common vinyl-acrylate copolymer. These copolymers are formed by the polymerization of ethylene and alkyl-acrylates such as methyl acrylate {$CH_2CH(COOCH_3)$} or ethyl acrylate {$CH_2CH(COOCH_2CH_3)$}, propyl acrylate, butyl acrylate, etc. Ethylene acrylic acid copolymer is another example of a common vinyl-acrylate copolymer.

The ethylene-ester copolymers that are useful in the compositions described herein have a melt index ($I_2$, 190° C., 2.16 kg, ASTM 1234) within the range of from 0.05 to 10 dg/min in one embodiment, and from 0.08 to 8 dg/min in another embodiment, and from 0.10 to 5 dg/min in yet another embodiment, and from 0.15 to 2 dg/min in yet another embodiment. The ethylene-ester copolymers that are useful in the compositions described herein have a density (ASTM D-1505) within the range of from 0.910 to 0.960 g/cm³ in one embodiment, and from 0.915 to 0.955 g/cm³ in another embodiment, and from 0.920 to 0.950 g/cm³ in yet another embodiment, and from 0.925 to 0.945 g/cm³ in yet another embodiment, and from 0.930 to 0.950 g/cm³ in yet a more particular embodiment.

The ethylene-ester copolymers that are useful in the compositions described herein have a 1% Secant Modulus MD (ASTM D 882, 100 μm film) within the range of from 10 to 100 MPa in one embodiment, and from 20 to 80 MPa in another embodiment, and from 30 to 70 MPa in yet another embodiment; and has a 1% Secant Modulus TD within the range of from 10 to 100 MPa in one embodiment, and from 20 to 80 MPa in another embodiment, and from 30 to 70 MPa in yet another embodiment. The ethylene-ester copolymers that are useful in the compositions described herein also have an Elongation at Break (ASTM D 882, 100 μm film) of greater than 200% in one embodiment, and greater than 300% in another embodiment, and greater than 400% in yet another embodiment, and within the range of from 100 to 1000% in one embodiment, and from 200 to 800% in yet another embodiment, and from 300 to 700% in yet another embodiment, in both TD and MD. Examples of commercially useful ethylene-ester copolymers include Escorene™ Ultra EVAs and ExxonMobil LDs (ExxonMobil Chemical Co.).

In the compositions described herein, there can be one or more different ethylene-ester copolymers present, "different" meaning that each of the ethylene-ester copolymers present may have a different comonomer content and/or some other distinct property, but such that all of the ethylene-ester copolymers fall within the broadest description of those copolymers herein. In one embodiment, the composition comprises 5 to 50 wt % of ethylene-ester copolymers by weight of the propylene-α-olefin copolymer and ethylene-ester copolymer, and from 5 to 30 wt % in another embodiment, and from 10 to 30 wt % in yet another embodiment, and from 5 to 20 wt % in yet another embodiment, and from 10 to 25 wt % in yet another embodiment, and from 15 to 25 wt % in yet another embodiment, and from 4 to 16 wt % in yet another embodiment.

The "propylene-α-olefin copolymers" described herein are copolymers of propylene-derived units and one or more units derived from ethylene or a $C_4$-$C_{10}$ α-olefin and optionally one or more diene-derived units. Preferred α-olefins are ethylene, 1-butene, 1-hexene and 1-octene. Typical comonomer content of the copolymer is from 5 to 35 wt % in one embodiment. In general, the comonomer content is adjusted so that the copolymer preferably has a MWD (Mw/Mn) of from 1.5 to 20, more preferably from 1.5 to 5, a heat of fusion ($H_f$) less than or equal to 75 J/g and a peak melting temperature ($T_m$) less than or equal to 105° C. In some embodiments, where more than one comonomer is present, the amount of a particular comonomer may be less than 5 wt %, but the combined comonomer content is preferably greater than 5 wt %.

In such an embodiment, when there is more than one α-olefin-derived unit in the copolymer, the total weight percent of the ethylene or $C_4$-$C_{10}$ α-olefin-derived units (or "α-olefin") is preferably from 5 to 35 wt %, more preferably from 7 to 32 wt %, more preferably from 8 to 25 wt %, more preferably from 8 to 20 wt %, and more preferably from 8 to 18 wt %. Particular embodiments of copolymers having more than one α-olefin include propylene-ethylene-octene, propylene-ethylene-hexene and propylene-ethylene-butene polymers. These copolymers may further comprise a diene as described below.

In a particular embodiment, the propylene-α-olefin copolymer comprises propylene-derived units and comonomer units selected from ethylene, 1-hexene and 1-octene. The copolymer comprises from 5 to 25 wt % monomer-derived units in one embodiment, and from 5 to 20 wt % in another embodiment, and from 5 to 16 wt % in yet another embodiment, and from 6 to 18 wt % in yet another embodiment, and from 8 to 20 wt % in yet another embodiment. In a more particular embodiment, the comonomer is ethylene.

The propylene-α-olefin copolymer, a propylene-ethylene copolymer in one embodiment, may optionally comprise less than or equal to 10 wt % diene derived units (or "diene"), preferably less than or equal to 5 wt % diene, more preferably less than or equal to 3 wt % diene, preferably from 0.1 to 3 or 4 or 5 or 6 wt %, more preferably from 0.1 to 2 wt %, and more preferably from 0.1 to 1 wt % diene. Suitable dienes useful as co-monomers are, for example: 1,4-hexadiene, 1,6-octadiene, 5-methyl-1,4-hexadiene, 3,7-dimethyl-1,6-octadiene, dicyclopentadiene (DCPD), ethylidiene norbornene (ENB), norbornadiene, 5-vinyl-2-norbornene (VNB), and combinations thereof. The diene, if present, is most preferably ENB.

The propylene-α-olefin copolymer can have a triad tacticity of three propylene units, as measured by $^{13}C$ NMR, of 75% or greater, 80% or greater, 82% or greater, 85% or greater, or 90% or greater. Preferred ranges include from 50 to 99%, more preferably from 60 to 99%, more preferably from 75 to 99% and more preferably from 80 to 99%; and in other embodiments from 60 to 97%. Triad tacticity was determined as follows: The tacticity index, expressed herein as "m/r", is determined by $^{13}C$ nuclear magnetic resonance (NMR). The tacticity index m/r is calculated as defined by H. N. Cheng in 17 MACROMOLECULES 1950 (1984). The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios of greater than 50. Embodiments of the propylene-α-olefin copolymer have a tacticity index m/r ranging from a lower limit of 4 or 6 to an upper limit of 8 or 10 or 12.

In certain embodiments the propylene-α-olefin copolymer has a heat of fusion ($H_f$), determined according to the Differential Scanning Calorimetry (DSC) procedure described herein, greater than or equal to 0.5 or 1 or 5 J/g, and is less than or equal to 75 J/g, preferably less than or equal to 70 J/g, more preferably less than or equal to 50 J/g, more preferably less than or equal to 35 J/g. Stated another way, in one or more embodiments the $H_f$ value is within the range of from 1.0, or 1.5, or 3.0, or 4.0, or 6.0, or 7.0 J/g to 30, or 35, or 40, or 50, or 60 or 70, or 80 J/g.

In certain embodiments, the propylene-α-olefin copolymer, a propylene-ethylene copolymer in one embodiment, has a percent crystallinity within the range of from 0.5 to 40%, preferably 1 to 30%, and more preferably 5 to 25% wherein "percent crystallinity" is determined according to the DSC procedure described herein. The thermal energy for the highest order of polypropylene is estimated at 189 J/g (i.e., 100% crystallinity is equal to 189 J/g). In another embodiment, the propylene-α-olefin copolymer of the present disclosure has a crystallinity within the range of less than 40%, and from 0.25 to 25% in another embodiment, and from 0.5 to 22% in yet another embodiment, and from 0.5 to 20% in yet another embodiment.

The propylene-α-olefin copolymer may have a single peak melting transition as determined by DSC; in certain embodiments the propylene-α-olefin copolymer has a primary peak melting transition at from less than 90° C., with a broad end-of-melt transition at greater than about 110° C. The peak "melting point" ($T_m$) is defined as the temperature of the greatest heat absorption within the range of melting of the sample. However, the propylene-α-olefin copolymer may show secondary melting peaks adjacent to the principal peak, and or the end-of-melt transition, but for purposes herein, such secondary melting peaks are considered together as a single melting point, with the highest of these peaks being considered the $T_m$ of the propylene-α-olefin copolymer. The propylene-α-olefin copolymer preferably has a $T_m$ value within the range of from less than and a peak melting temperature ($T_m$) less than or equal to 70 or 80 or 90 or 100° C. in one embodiment; and within the range of from 25 to 100° C. in yet another embodiment, and from 25 to 85° C. in yet another embodiment, and from 25 to 75° C. in yet another embodiment, and from 25 to 65° C. in yet another embodiment, and from 30 to 80° C. in yet another embodiment, and from 30 to 70° C. in yet a more particular embodiment.

The procedure for DSC determinations is as follows. About 0.5 grams of polymer was weighed out and pressed to a thickness of about 15-20 mils (about 381-508 microns) at about 140° C.-150° C., using a "DSC mold" and Mylar as a backing sheet. The pressed pad was allowed to cool to ambient temperature by hanging in air (the Mylar was not removed). The pressed pad was annealed at room temperature (about 23-25° C.) for about 8 days. At the end of this period, an about 15-20 mg disc was removed from the pressed pad using a punch die and was placed in a 10 microliter aluminum sample pan. The sample was placed in a differential scanning calorimeter (Perkin Elmer Pyris 1 Thermal Analysis System) and was cooled to about –100° C. The sample was heated at about 10° C./min to attain a final temperature of about 165° C. The thermal output, recorded as the area under the melting peak of the sample, is a measure of the heat of fusion and can be expressed in Joules per gram (J/g) of polymer and was automatically calculated by the Perkin Elmer System. Under these conditions, the melting profile shows two (2) maxima, the maxima at the highest temperature was taken as the melting point within the range of melting of the sample relative to a baseline measurement for the increasing heat capacity of the polymer as a function of temperature.

In certain embodiments, the propylene-α-olefin copolymer can have a density within the range of from 0.850 to 0.920 g/cm$^3$, more preferably, 0.860 to 0.900 g/cm$^3$, more preferably 0.860 to 0.890 g/cm$^3$ at room temperature as measured per the ASTM D-1505 test method.

In certain embodiments, the propylene-α-olefin copolymer can have a melt flow rate (MFR, ASTM D1238, 2.16 kg, 230° C.), equal to or greater than 0.2 dg/min. Preferably, the MFR is from 0.5 to 5000 dg/min and more preferably from 1 to 2500 dg/min. In one embodiment, the propylene-α-olefin copolymer has an MFR within the range of from 0.5 to 1500 dg/min, from 2 to 1000 dg/min in another embodiment, and from 5 to 500 dg/min in yet another embodiment, and from 10 to 250 dg/min in yet another embodiment, and from 10 to 100 dg/min in yet another embodiment, and from 2 to 40 dg/min in yet another embodiment, and from 2 to 30 dg/min in yet another embodiment, and from 0.5 to 10 dg/min in yet another embodiment.

In certain embodiments, the propylene-α-olefin copolymers, propylene-ethylene copolymers in one embodiment, may have a Mooney viscosity value [ML (1+4) @ 125° C.] as determined according to ASTM D1646, of less than 100, more preferably less than 75, even more preferably less than 60, most preferably less than 30. In yet another embodiment, the propylene-α-olefin copolymers possess an Elongation at Break (ASTM D 412) of less than 2000%, and less than 1000% in another embodiment, and less than 800% in yet another embodiment.

In one embodiment, the propylene-α-olefin copolymer has a Mw value within the range of from 5,000 to 5,000,000 g/mole, more preferably a Mw of 10,000 to 1,000,000, and more preferably a Mw of 50,000 to 400,000. In another embodiment, the propylene-α-olefin copolymer has a Mn value within the range of from 2,500 to 2,500,000 g/mole, more preferably a Mn of 10,000 to 250,000, and more preferably a Mn of 25,000 to 200,000. In yet another embodiment, the propylene-α-olefin copolymer can have a Mz value within the range of from 10,000 to 7,000,000 g/mole, more preferably a Mz of 80,000 to 700,000, and more preferably a Mz of 100,000 to 500,000.

The molecular weight distribution (MWD) of the propylene-α-olefin copolymer is within the range of from 1.5 to 20 in one embodiment, and from 1.5 to 15 in another embodiment, and more preferably 1.5 to 5, more preferably 1.8 to 5 and most preferably 1.8 to 3 or 4.

Techniques for determining the molecular weight (Mn, Mz and Mw) and molecular weight distribution (MWD) are as follows, and as in Verstate et al. in 21 MACROMOLECULES 3360 (1988). Conditions described herein govern over published test conditions. Molecular weight and molecular weight distribution are measured using a Waters 150 gel permeation chromatograph equipped with a Chromatix KMX-6 on-line light scattering photometer. The system was used at 135° C. with 1,2,4-trichlorobenzene as the mobile phase. Showdex (Showa-Denko America, Inc.) polystyrene gel columns 802, 803, 804 and 805 are used. This technique is discussed in LIQUID CHROMATOGRAPHY OF POLYMERS AND RELATED MATERIALS III 207 (J. Cazes ed., Marcel Dekker, 1981). No corrections for column spreading were employed; however, data on generally accepted standards, e.g., National Bureau of Standards Polyethylene 1484 and anionically produced hydrogenated polyisoprenes (an alternating ethylenepropylene copolymer) demonstrate that such corrections on Mw/Mn or Mz/Mw are less than 0.05 units. Mw/Mn was calculated from an elution time-molecular weight relationship whereas Mz/Mw was evaluated using the light scattering photometer. The numerical analyses can be performed using the commercially available computer software GPC2, MOLWT2 available from LDC/Milton Roy-Riviera Beach, Fla.

The propylene-α-olefin copolymers can include copolymers prepared according to the procedures in WO 02/36651, U.S. Pat. No. 6,992,158, and/or WO 00/01745. Preferred methods for producing the propylene-α-olefin copolymers are found in US Patent Application Publication 2004/0236042 and U.S. Pat. No. 6,881,800. Preferred propylene-α-olefin copolymers are available commercially under the trade names Vistamaxx™ (ExxonMobil Chemical Company, Houston, Tex., USA) and Versify™ (The Dow Chemical Company, Midland, Mich., USA), certain grades of Tafiner™ XM or Notio™ (Mitsui Company, Japan) or certain grades of Softel™ (Basell Polyolefins of the Netherlands).

In the compositions described herein, there can be one or more different propylene-α-olefin copolymers, "different" meaning that the propylene-α-olefin copolymers each have a different comonomer content, comonomer identity and/or some other distinct property, but such that all of the propylene-α-olefin copolymers fall within the broadest description of those copolymers described herein. In one embodiment, the composition comprises 50 to 95 wt % by weight of the propylene-α-olefin copolymer and ethylene-ester copolymer, of the propylene-α-olefin copolymer, and from 55 to 90 wt % in another embodiment, and from 50 to 70 wt % in yet another embodiment, and from 60 to 80 wt % in yet another embodiment, and from 65 to 75 wt % in yet another embodiment, and from 55 to 65 wt % in yet another embodiment.

As used herein, an "anti-block" agent is any compound or mixture of compounds, minerals, treated minerals, etc. that is used in polyolefins to lower the tackiness of the polyolefin, especially as used in polyolefin films. Examples of anti-blocking agents include porous inorganic oxide materials, in one embodiment those from the Periodic Table of Elements of Groups 2, 3, 4, 5, 13 or 14 metal oxides, and most preferably Groups 4, 13 and 14. Non-limiting examples of suitable anti-block agents include silica, alumina, silica-alumina, and mixtures thereof are particularly desirable. Common talcs and clays can also be used. Other inorganic oxides that may be employed either alone or in combination with the silica, alumina or silica-alumina are magnesia, titania, zirconia, and the like. A commercial example of suitable anti-blocking agents include Sibelite™ M4000 (Sibelco), a high purity silica, and other Sibelite silicas.

The anti-block agent can be added to the compositions disclosed herein as a neat solid, a slurry in a liquid such as a hydrocarbon- or silicon-based processing oil, or as part of a masterbatch that can include, for example, polyolefinic polymers (low density polyethylene, high density polyethylene, polypropylene) polystyrene, etc, or be part of a thermoplastic vulcanizate as described further below. In the compositions described herein, there can be one or more different anti-block agents, "different" meaning that the anti-block agents each have a different structure and/or some other distinct property, but such that all of the block-agent fall within the broadest description of those agents herein. In one embodiment, the compositions herein comprises from 0.50 to 10 wt % of the anti-block agent by weight of the composition, and from 1 to 8 wt % in another embodiment, and from 2 to 7 wt % in yet another embodiment, and from 2.5 to 6.5 wt % in yet another embodiment, and from 2 to 8 wt % in yet another embodiment, wherein a desirable range may comprise any upper limit described herein with any lower limit described herein.

In one embodiment, the composition consists essentially of one or more anti-block agent(s), and consists essentially of one anti-block agent in a particular embodiment.

As used herein, a "slip-agent" is a compound or mixture of compounds that are useful when added to polyolefin compositions, wherein upon addition to the polyolefin will facilitate the polymer's removal from, for example, a mold other surface. The slip-agent is an organic amine compound (containing an amine group with hydrocarbon groups bound thereto) in a particular embodiment, and a fatty acid amine or fatty acid amide in yet a more particular embodiment. In certain embodiments, the slip-agent has one or more paraffinic or olefinic group bound to a nitrogen atom, forming an amine or an amide compound. In one embodiment, the paraffinic or olefinic group includes (as a side chain or within the backbone) a polar or ionic moiety. Such polar or ionic moeties can include hydroxyl groups, carboxylate groups, ether groups, ester groups, sulfonate groups, sulfite groups, nitrate groups, nitrite groups, phosphate groups, phosphite groups and combinations thereof. In one embodiment, the paraffinic or olefinic groups are selected from the group consisting of $C_1$ to $C_{40}$ alkyls and substituted alkyls; and are $C_{10}$ to $C_{40}$ alkyls or substituted alkyls in a particular embodiment. By "substituted," what is meant is a substation of a polar or ionic moiety at some point along the hydrocarbon chain; such moieties can include hydroxyl groups, carboxylate groups, ether groups, ester groups, sulfonate groups, sulfite groups, nitrate groups, nitrite groups, phosphate groups, phosphite groups and combinations thereof.

In one embodiment, the slip-agent is an alkyl-ether amine having the following formula: $(R'OH)_{3-x}NR_x$, wherein R is selected from the group consisting of hydrogen atoms, $C_1$ to $C_{40}$ alkyl radicals, $C_2$ to $C_{40}$ alkylethers, $C_1$ to $C_{40}$ alkylcarboxylic acids, and $C_2$ to $C_{40}$ alkylesters; and R' is selected from $C_1$ to $C_{40}$ alkyl radicals, $C_2$ to $C_{40}$ alkylethers, $C_1$ to $C_{40}$ carboxylic acids, and $C_2$ to $C_{40}$ alkylesters; and wherein x is 0, 1, 2 or 3; preferably x is 0 or 1, and is 1 in a particular embodiment. In yet another embodiment, the R group is selected from the group consisting of hydrogen atoms and $C_5$ to $C_{40}$ alkyl radicals; and the R' is selected from $C_5$ to $C_{40}$ alkyl radicals and $C_5$ to $C_{40}$ alkylethers.

In another embodiment, the slip-agent is an fatty acid amide having the following formula: $(R'CO)_{3-x}NR_x$, wherein R is selected from the group consisting of hydrogen atoms, $C_{10}$ to $C_{60}$ alkyl radicals and $C_{10}$ to $C_{60}$ alkene radicals, and substituted versions thereof; and R' is selected from $C_{10}$ to $C_{60}$ alkyl radicals, and $C_{10}$ to $C_{60}$ alkene radicals and substituted versions thereof; and wherein x is 0, 1, 2 or 3; preferably x is 1 or 2, and is 2 in a particular embodiment. In this embodiment, an "alkene" radical is one wherein one or more double-bond unsaturation occurs in the radical chain (e.g., —$CH_2CH_2CH_2CH_2CH$=$CHCH_2CH_2CH_2CH_2CH_3$). By "substituted," what is meant is a substation at some point along the hydrocarbon chain of a hydroxyl group, carboxyl group, a halide, or a sulfate group.

Non-limiting examples of useful slip-agents include bis(2-hydroxyethyl) isodecyloxypropylamine, poly(5)oxyethylene isodecyloxypropylamine, bis(2-hydroxyethyl) isotridecyloxypropylamine, poly(5)oxyethylene isotridecyloxypropylamine, bis(2-hydroxyethyl) linear alkyloxypropylamine, bis(2-hydroxyethyl) soya amine, poly(15)oxyethylene soya amine, bis(2-hydroxyethyl) octadecylamine, poly(5)oxyethylene octadecylamine, poly(8)oxyethylene octadecylamine, poly(10)oxyethylene octadecylamine, poly(15)oxyethylene octadecylamine, bis(2-hydroxyethyl) octadecyloxypropylamine, bis(2-hydroxyethyl) tallow amine, poly(5)oxyethylene tallow amine, poly(15)oxyethylene tallow amine, poly(3) oxyethylene-1,3-diaminopropane, bis(2-hydroxethyl) cocoamine, bis(2-hydroxyethyl) isodecyloxypropylamine, poly(5)oxyethylene isodecyloxypropylamine, bis(2-hydroxyethyl) isotridecyloxypropylamine, poly(5)oxyethylene isotridecyloxypropylamine, bis(2-hydroxyethyl) linear alkyloxypropylamine, bis(2-hydroxyethyl) soya amine, poly(15)oxyethylene soya amine, bis(2-hydroxyethyl) octadecylamine, poly(5)oxyethylene octadecylamine, poly(8)oxyethylene octadecylamine, poly(10)oxyethylene octadecylamine, poly(15)oxyethylene octadecylamine, bis(2-hydroxyethyl) octadecyloxypropylamine, bis(2-hydroxyethyl) tallow amine, poly(5)oxyethylene tallow amine, poly(15)oxyethylene tallow amine, poly(3) oxyethylene-1,3-diaminopropane, bis(2-hydroxethyl) cocoamine, valeramide, caproicamide, erucamide, caprylicamide, pelargonicamide, capricamide, lauricamide, myristicamide, palmiticamide, margaric (daturic) amide, stearicamide, arachidicamide, behenicamide, lignocericamide, ceroticamide, carbocericamide, montanicamide, melissicamide, lacceroicamide, ceromelissic (psyllic) amide, geddicamide, 9-octadecenamide, oleamide, stearamide, tallow bis(2-hydroxyethyl)amine, cocobis(2-hydroxyethyl)amine, octadecylbis(2-hydroxyethyl)amine, oleylbis(2-hydroxyethyl)amine and ceroplastic amide. Commercial examples of useful slip-agents are the Atmer™ compounds (Ciba Specialty Chemicals), Amid™, Armofilm™ and Armoslip™ compounds and Nourymix™ concentrates (Akzo Nobel Chemicals).

In the compositions described herein, there can be one or more different slip-agents, "different" meaning that the slip-agents each have a different structure and/or some other distinct property, but such that all of the slip-agents fall within the broadest description of those agents herein. The slip-agent can be added to the composition in its neat form, diluted, and/or as a masterbatch in, for example, polyolefinic polymers (polypropylene, polystyrene, low density polyethylene, or high density polyethylene). In one embodiment, the composition comprises from 0.01 to 5 wt % of the slip-agent by weight of the composition, and from 0.02 to 4 wt % in another embodiment, and from 0.04 to 3 wt % in yet another embodiment, and from 0.05 to 2 wt % in yet another embodiment, and from 0.08 to 1.5 wt % in yet another embodiment, wherein a desirable range may comprise any upper limit described herein with any lower limit described herein.

In one embodiment, the composition consists essentially of one or more slip-agent(s), and consists essentially of one slip-agent agent in a particular embodiment.

The components that make up each composition can be melt-blended either in the same melt-blending means used in the film-making process, or separately. In one embodiment, the components are combined in a melt-blending means separately from then being used in the film-making process. In a particular embodiment, the components are combined in an extruder or high intensity mixer, a twin screw extruder in one embodiment. A shear force and/or other heating means, if necessary, are applied to the components within the extruder to bring the temperature of the melt to at least the melting point of the highest melting component, and to at least 160 or 180 or 200 or 220 or 230° C. in preferred embodiments.

To make films from the inventive compositions, any process that is known in the art can be used such as film-blowing, tenter processes, and casting; the inventive compositions can also be used in extrusion coating and thermoforming. In a preferred embodiment, the compositions are used to make blown films. Most any coextrusion blown film equipment known in the art can be used. In one aspect, there are some desirable extrusion conditions in making the inventive films.

The extruder speeds and outputs for making the films described herein are limited only to the capability of the equipment that is used. The extruder speed, output, and other process variables can vary for each layer that is extruded to make a film. In one aspect, extruder speeds for making films described herein can be within the range of from 10 to 100 rpm, and from 10 to 50 rpm in one embodiment, and from 15 to 40 rpm in another embodiment, and from 18 to 35 rpm in a particular embodiment, and from 25 to 50 rpm in yet another embodiment, and from 40 to 70 rpm in yet another embodiment, and from 50 to 100 rpm in yet another embodiment. The extruder output can be within the range from 10 to 100 kg/h in one embodiment, and from 10 to 50 kg/h in another embodiment, and from 15 to 40 kg/h in another embodiment, and from 15 to 35 kg/h in yet another embodiment, and from 40 to 80 kg/h in yet another embodiment. The melt temperature of the extrudate can be within the range from 150 to 230° C. in one embodiment, and from 160 to 200° C. in a particular embodiment. The melt pressure in the extruder can be within the range from 150 (15 MPa) to 300 bar (30 MPa) in one embodiment, and from 155 (15.5 MPa) to 260 bar (26 MPa) in another embodiment. The setpoint temperature of the extruder die can be within the range from 150 to 280° C. in one embodiment, and from 160 to 250° C. in another embodiment, and from 165 to 220° C. in yet another embodiment. Finally, the die temperature can range from 140 to 220° C. in one embodiment, and from 150 to 200° C. in another embodiment.

The films that are formed from the compositions disclosed herein can be derived from one, two, three or more layers. Each layer is typically extruded separately, then combined to form one film structure. In a particular embodiment, three layers of composition are extruded to form a three layer film. In certain embodiments, a collapsed bubble forms the final film in which one layer, an "inner skin" and core or "middle" layer are combined into a thick new layer. The composition making up the outer skin layer of the blown film bubble preferably constitutes both skin layers of the final film. Preferably, the coextrusion blown film line has two, three or more (depending on the desired number of layers) extruders to melt, homogenize and pump the compositions making each layer of film. Any one of the extruders can have any set of desirable dimensions, independent of one another. Further, any one of the extruders can have a smooth feed zone or grooved feed zone. In one embodiment, the extruder has a diameter within the range of from 30 or 40 mm to 50 or 60 or 80 or 90 or 100 or 200 mm and has a grooved feed zone or a smooth bore feed zone, preferably a smooth bore feed zone. In other embodiments, the diameter of the extruder is within the range from 40 to 80 mm, and from 50 to 80 mm in another embodiment, and from 50 to 200 mm in yet another embodiment. Further, the extruders used in the film making process can have a length/diameter (L/D) ratio within the range of from 20 to 50 in one embodiment, and from 25 to 45 in another embodiment, and from 15 to 60 in yet another embodiment, and from 25 to 60 in yet another embodiment.

The polymers and/or additional components of the compositions described herein can be fed into the extruders by any means known in the art, such as by a gravimetric feeding system in one embodiment. Each extruder can be equipped with one, two, three, four, five or more feeding hoppers, depending upon the compositions. The blending for each extruder takes place in the special mixing hopper mounted below the feeding hoppers, from where the blend is discharged into the extruder. Each extruder is connected to the die via a screen changer and an adapter. The melt flows are shaped in the die through an annular gap.

After leaving the die, the tubular melt is drawn and blown as a bubble by air fed through the die in one embodiment. Typically, inside the bubble, cool air is blown on the melt, while the warm air is extracted via the exhaust pipe. The die diameter can be within a range of from 100 to 500 mm in one embodiment, and from 190 to 350 mm in another embodiment, and from 200 to 300 mm in another embodiment, and from 210 to 260 in yet another embodiment, and from 200 to 500 mm in yet another embodiment. The blow up ratio ("BUR") for the blown films can be within a range of from 1 to 10 in one embodiment, and from 1.5 to 8 in another embodiment, and from 1.8 to 5 in yet another embodiment, and from 2.0 to 3.5 in another embodiment, and from 2.2 to 3.0 in yet another embodiment; and the die gap can be within a range of from 0.5 to 9 mm in one embodiment, and from 0.8 to 5 mm in another embodiment, and from 0.8 to 3 mm in yet another embodiment, and from 1.0 to 2.0 mm in yet another embodiment.

In certain embodiments of the film blowing process, the composition melt is simultaneously cooled on the outside by a dual lip air ring. This air ring provides the main cooling and sets the frost line. The cooling air can be refrigerated in a heat exchanger connected to the chilled water circuit of the site. The bubble is stabilized in the calibration basket in certain embodiments, wherein the bubble then enters the collapsing stage. The flat tube leaving the collapsing frame passes immediately through the nip rolls that squeeze the film flat. The film can then be guided over several idler rollers to the web center table, for web alignment. From there the film can be further treated through the corona treating station to contact winder.

The films made from the inventive compositions can have any number of layers in any ratio of thicknesses. In a preferred embodiment, a three layer film is produced having an outer skin layer, a middle layer, and an inner skin layer in a ratio within a range of from 1/1/1 to 1/20/1 in one embodiment, and from 1/2/1 to 1/15/1 in another embodiment, and from 1/3/1 to 1/10/1 in yet another embodiment. Each layer can be any desirable thickness, and is within the range of from 1 to 100 μm in one embodiment, and from 2 to 80 μm in another embodiment, and from 2 to 60 μm in yet another embodiment, and from 3 to 40 μm in yet another embodiment, and from 4 to 15 μm in yet another embodiment. Given the variety of film structures as mentioned above (e.g., ABA, AAB, AABAA, etc.), the total film thickness can vary greatly. In one embodiment the total film thickness or "film thickness" is within the range from 10 to 500 μm, and from 20 to 400 μm in another embodiment, and from 30 to 300 μm in yet another embodiment, and from 40 to 200 μm in yet another embodiment, and from 50 to 150 μm in yet another embodiment. Of course, a desirable thickness range of the layers and film can comprise any combination of an upper limit with any lower limit as described herein.

Thus, in one aspect of the invention is a process for making a film comprising melt blending one or more propylene-α-olefin copolymer(s) comprising propylene-derived units and from 5 to 35 wt % (by weight of the propylene-α-olefin copolymer) of ethylene-derived units and/or $C_4$ to $C_{10}$ α-olefin-derived units, and having a Mooney viscosity [ML (1+4) @ 125° C.] as determined according to ASTM D1646, of less than 50, and a $T_m$ of less than 90° C.; and one or more ethylene-ester copolymer(s); and extruding the intimately blended melt through one or more die(s) having one or more die gap(s) within the range of from 0.5 to 9 mm. In one embodiment, the extrudate from the die is blown with air to a BUR within the range of from 1 to 10 to form a blown film. The extruder in this aspect is a grooved feed extruder operating at a melt pressure of from 15 to 30 MPa in one embodiment, and a die temperature of from 140 to 220° C. in one embodiment, and has a diameter of from 30 to 200 mm in one embodiment, and an L/D of from 20 to 50 in one embodiment. In certain embodiments of the process described herein, there are two, three or more dies, each with a corresponding extrudate of melt-blended composition that is the same or different. In a particular embodiment, there are three extrudates having an ABA configuration; wherein the A layer also comprises a slip-agent and anti-blocking agent.

The films made from the compositions of the present invention have unique properties that allow them to be used as elastic films and can be extruded by blown film equipment with good bubble stability. The various properties, as determined by the test methods below, are measured with respect to ABA-type (skin/middle/skin) films having a total thickness of from 90 to 110 μm made from the composition(s) described herein:

The films having the "ABA" configuration described herein possess a coefficient of friction, static, (COF) within the range of from 0.10 to 0.60 in one embodiment, and from 0.15 to 0.50 in another embodiment, and from 0.18 to 0.40 in yet another embodiment, and from less than 0.40 in yet another embodiment, and from less than 0.35 in yet another embodiment.

The ABA films described herein possess a coefficient of friction, kinetic, (COF) within the range of from 0.10 to 0.60 in one embodiment, and from 0.15 to 0.50 in another embodiment, and from 0.18 to 0.40 in yet another embodiment.

The ABA films described herein possess a Puncture Energy at Maximum Force within the range of from 15 to 150 mJ/μm in one embodiment, and from 15 to 120 mJ/μm in another embodiment, and from 15 to 50 mJ/μm in yet another embodiment.

The ABA films described herein possess a Puncture Force at Break within the range of from 0.15 to 1.0 N/μm in one embodiment, and from 0.20 to 0.80 N/μm in another embodiment, and from greater than 0.20 N/μm in yet another embodiment, and from greater than 0.25 N/μm in yet another embodiment.

The ABA films described herein possess a Puncture Energy at Break within the range of from 15 to 200 mJ/μm in one embodiment, and from 20 to 150 mJ/μm in another embodiment, and from 15 to 50 mJ/μm in yet another embodiment, and greater than 20 mJ/μm in yet another embodiment.

The ABA films described herein possess a Haze value within the range of from 10 to 50 in one embodiment, and greater than 10 in yet another embodiment, and less than 50 in yet another embodiment, and less than 40 in yet another embodiment.

The ABA films described herein possess a Gloss value within the range of from 10 to 50 in one embodiment, and greater than 10 in yet another embodiment, and less than 50 in yet another embodiment, and less than 40 in yet another embodiment.

The ABA films described herein possess a Tensile Strength at Break (TD, 23° C.) within the range of from 10 to 60 MPa in one embodiment, and from 15 to 50 MPa in another embodiment, and from 18 to 40 MPa in yet another embodiment, and greater than 15 MPa in yet another embodiment.

The ABA films described herein possess an Elongation at Break (TD, 23° C.) within the range of from greater than 200% in one embodiment, and greater than 400% in another embodiment, and greater than 600% in yet another embodiment, and from 300 to 1000% in yet another embodiment, and from 400 to 800% in yet another embodiment.

The ABA films described herein possess a 1% Modulus (TD, 23° C.) within the range of from 10 to 50 MPa in one embodiment, and from 15 to 40 MPa in another embodiment, and from greater than 15 MPa in yet another embodiment.

The ABA films described herein possess a Tensile at Break (MD, 23° C.) within the range of from 10 to 50 MPa in one embodiment, and from 15 to 40 MPa in another embodiment, and from greater than 10 MPa in yet another embodiment, and from greater than 15 MPa in yet another embodiment.

The ABA films described herein possess an Elongation at Break (MD, 23° C.) within the range of from greater than 200% in one embodiment, and greater than 300% in another embodiment, and greater than 500% in yet another embodiment, and from 300 to 1000% in yet another embodiment, and from 400 to 800% in yet another embodiment.

The ABA films described herein possess a 1% Modulus (MD, 23° C.) within the range of from 10 to 50 MPa in one embodiment, and from 12 to 40 MPa in another embodiment, and from greater than 10 MPa in yet another embodiment.

The ABA films described herein possess a Permanent Set After Elongation to 200% (TD) (200%) of from 5 to 60% in one embodiment, and from 10 to 50% in another embodiment, and from less than 60% in yet another embodiment, and from less than 40% in yet another embodiment, and from less than 30% in yet another embodiment.

The ABA films described herein possess a Set After $2^{nd}$ Stretch (TD) (200%) of from 2 to 40% in one embodiment, and from 4 to 45% in another embodiment, and from greater than 2% in yet another embodiment, and from greater than 5% in yet another embodiment.

The ABA films described herein possess a Permanent Set after Elongation to 200% (MD) (200%) of from 10 to 50% in one embodiment, and from 15 to 40% in another embodiment, less than 60% in yet another embodiment, and from less than 50% in yet another embodiment, and from less than 40% in yet another embodiment.

The ABA films described herein possess a Set After $2^{nd}$ Stretch (MD) (200%) of from 2 to 40% in one embodiment, and from 4 to 45% in another embodiment, and from greater than 2% in yet another embodiment, and from greater than 5% in yet another embodiment.

In certain embodiments, the compositions also include a thermoplastic vulcanizate ("TPV"). In particular embodiments, the TPV is added in the place of the ethylene-ester copolymer, slip-agent and anti-blocking agents. The TPV can make up from 40 to 90 wt % of the composition with the propylene-α-olefin copolymer(s) in one embodiment, and from 50 to 80 wt % in another embodiment, and from 50 to 70 wt % in yet another embodiment (by weight of the propylene-α-olefin copolymers and TPV combined).

Thermoplastic vulcanizates—blends of a thermoplastic and an at least partially cured rubber—are well known in the art. The rubber employed to form the thermoplastic vulcanizate is not limited to any one particular rubber. As used herein, "rubber" refers to elastomeric polymers or those polymers that exhibit a glass transition temperature ($T_g$) of less than 0° C., preferably less than −20° C., and even more preferably less than −65° C. that are able to undergo dynamic vulcanization. The slip-coat compositions described herein include one or more thermoplastic vulcanizates.

Useful rubbery polymers used in TPVs preferably contain some degree of unsaturation. Examples of rubbery polymers include olefinic elastomeric copolymers, butyl rubber, natural rubber, styrene-butadiene copolymer rubber, butadiene rubber, acrylonitrile rubber, halogenated rubber such as brominated and chlorinated isobutylene-isoprene copolymer rubber, butadiene-styrene-vinyl pyridine rubber, urethane rubber, polyisoprene rubber, epichlolorohydrin terpolymer rubber, and polychloroprene.

The thermoplastic portion of the TPV can be any thermoplastic known in the art such as propylene-based polymers (60 to 100 wt % propylene derived units), ethylene-based polymers (60 to 100 wt % ethylene derived units), and polyamides. In a preferred embodiment, propylene polymers form the thermoplastic portion of the thermoplastic vulcanizate. The propylene polymers and copolymers include polypropylene homopolymers and copolymers that are formed by polymerizing propylene with one or more of ethylene, 1-butene, 1-hexene, 1-octene, 2-methyl-1-propene, 3-methyl-1-pentene, 4-methyl-1-pentene, 5-methyl-1-hexene, and mixtures thereof. Specifically included are the reactor, impact, and random copolymers of propylene with ethylene or the higher α-olefins, described above, or with $C_{10}$-$C_{20}$ diolefins. Comonomer contents for these propylene copolymers will typically be from 1 to 30 wt % of the polymer. Blends or mixtures of two or more polyolefin thermoplastics such as described herein, or with other polymeric modifiers, are also suitable in accordance with this invention. The thermoplastic is preferably a propylene homopolymer or copolymer comprising from 0.1 to 15 wt % ethylene-derived units, most preferably a homopolymer copolymer comprising from 0.5 to 10 wt % ethylene-derived units.

A preferred TPV has a Shore A hardness (ASTM D2240) within the range of from 30 to 120, in one embodiment, and from 35 to 100 in another embodiment, and from 40 to 80 in yet another embodiment; and has an Elongation at Break of from greater than 200 in one embodiment, and greater than 300 in another embodiment, and greater than 400 in yet another embodiment (ASTM D 412). Thermoplastic vulcanizates typically include hydrocarbon oils and fillers such as talc and/or silica. An example of a useful commercial TPV is Santoprene™ grades of thermoplastic vulcanizates (ExxonMobil Chemical Co.).

Plastomers can also be used optionally, either as part of the composition or in place of the propylene-α-olefin copolymer(s) altogether, in certain embodiments. The plastomer can make up from 40 to 90 wt % of the composition with the propylene-α-olefin copolymer(s) in one embodiment, and from 50 to 80 wt % in another embodiment, and from 50 to 70 wt % in yet another embodiment (by weight of all of the components combined).

A plastomer comprises ethylene-derived units and one or more of $C_3$ to $C_8$ α-olefin derived units from 1 wt % to 40 wt % of the plastomer in one embodiment, and from 5 to 35 wt % of the plastomer in another embodiment, and from 5 to 30 wt % of the plastomer in yet another embodiment. More particularly, a plastomer is a copolymer of ethylene-derived units and one or more of non-cyclic mono-olefins such as propylene, 1-butene, 1-pentene, 1-hexene, 1-octene and 4-methyl-1-pentene. However, cyclic mono-olefins and both linear and cyclic dienes can also be used in copolymerization with ethylene to form the plastomer. It is desirable in some applications to use ethylene-α-olefin-diene terpolymers. This is advantageous in that it provides the plastomer with residual unsaturation to allow a functionalization reaction or cross-linking in the rubber phase of the finished product if desired.

In a preferred embodiment, the plastomer is a copolymer of ethylene derived units and 1-hexene or 1-octene derived units, wherein the 1-hexene or 1-octene derived units are present from 5 to 50 wt % of the plastomer in one embodiment, from 15 to 50 wt % of the plastomer in another embodiment, and from 20 to 50 wt % in another embodiment, and from 30 to 50 wt % in yet another embodiment.

In one embodiment of the invention, the plastomer has a density (ASTM D-1505) in the range of 0.860 to 0.915 g/cm³, and a density of from 0.860 to 0.915 g/cm³ in another embodiment, and from 0.865 to 0.915 g/cm³ in one embodiment, and in the range of from 0.860 to 0.900 g/cm³ in yet another embodiment, and in the range of 0.855 to 0.908 g/cm³ in yet another embodiment, and in the range of 0.860 to 0.900 g/cm³ in yet another embodiment.

The $I_2$ (2.16 kg/190° C.) of the plastomer is in the range of from 0.10 to 40 dg/min in one embodiment, and from 0.5 to 10 dg/min in another embodiment, and from 1.0 to 6.0 dg/min in another embodiment, and from 1.5 to 5.0 dg/min in yet another embodiment.

Desirable plastomers are sold, for example, under the trademark Exact™ (ExxonMobil Chemical Company, Houston, Tex.), such as Exact 5171. The invention can also be practiced using Engage™ polymers (also Affinity™ and Versify™; Dow Chemical Company, Midland, Mich.) and Tafiner™ (Mitsui Petrochemical Co.).

The compositions disclosed herein are useful in making elastic films for elastic diaper components, bandages and other wound care products, elastic and/or conformable tape (e.g., electrical insulation tape), soft PVC replacement (soft, flexible pouches, blood bags, renal bags) and other applications where flexibility and strength are desired.

Examples of this Invention

The first set of experiments were conducted using the components described in Table 1. The propylene-α-olefin copolymers are labeled αPP-A and αPP-B and a description of each is in Table 1. The "hPP" is PP4352F1 (ExxonMobil Chemical Co.) a film grade of polypropylene homopolymer; the "LDPE" is LD150BW (ExxonMobil Chemical Co.), a low density polyethylene; the ethylene-ester copolymer ("EVA") is Escorene™ Ultra FL00018 (ExxonMobil Chemical Co.), polyethylene vinyl acetate copolymer having 18 wt % of vinyl-acetate derived units; the "TPV" is a Santoprene™ 8201-80 thermoplastic vulcanizate (ExxonMobil Chemical Co.). Finally, the "S-A" masterbatch was a mixture comprising αPP-B, antiblock agent, and slip agent in a ratio of 65/30/5, respectively; the antiblock agent is Sibelite™ M4000 (Sibelco), a high purity silca. The slip agent in the masterbatch is Crodamide™ VRX (Croda), an oleamide.

The components of the masterbatch were combined by a 35 mm Leistritz twinscrew extruder, independent of film extrusion. The melt temperature at the die was about 120° C., temperature along the barrel ranged from 80 to 120° C.; melt pressure at the die was about 118 bar, 230 rpm screw speed and 15 kg/hr feed rate.

Table 2 lists the film structures made from the Sample compositions, with the relative amounts of each component in each sample composition. The Samples A, B and C were transitional runs using LDPE blended with the propylene-α-olefin-copolymer, and D-G are the inventive examples, having a total film thickness of 100 μm. The conditions for the extrusion of the blown films are outlined in Table 3. The conditions for A-C are similar to D-G. For example A, the inner skin layer was LDPE and the blown film bubble could be opened after the collapsing frame and the final film thickness was identical to the bubble thickness. For samples B to G, the inner skin layer is the very tacky, non formulated propylene-α-olefin/EVA blend of same composition as the core layer extrudate. For these samples, the collapsed bubble forms the final film in which inner skin and core layer are combined into a thick new core layer. The outer skin layer of the blown film bubble constitutes both skin layers of the final film. Referring to Table 2, this means that skin layer C is the inner skin layer of the blown film bubble for example A, while it is the outer skin layer of the blown film bubble for examples B to G. The W&H coextrusion blown film line has three Varex™ extruders to melt, homogenize and pump the polymers. The outer extruder has a diameter of 60 mm and a smooth bore feed zone, while the inner extruder has also a diameter of 60 mm but with a grooved feed section. The middle layer is fed by a 90 mm grooved feed extruder. All extruders have a 30 L/D ratio.

The polymers were fed into the extruders by gravimetric feeding systems. Each extruder is equipped with five feeding hoppers, one for the main component and four dosing hoppers for additional components. The blending for each extruder took place in the special mixing hopper mounted below the feeding hoppers, from where the blend is discharged into the extruder. Each extruder was connected to the die via a screen changer and an adapter. The melt flows are shaped in the die through an annular gap.

After leaving the die, the tubular melt was drawn and blown as a bubble by air fed through the die. Inside the bubble, cool air is blown on the melt, while the warm air was extracted via the exhaust pipe. The die diameter is 250 mm. The melt was simultaneously cooled on the outside by the Multicool™ dual lip air ring, which houses also the Optifil™ P2K gauge control system. This air ring provides the main cooling and sets the frost line. The cooling air was refrigerated in a heat exchanger connected to the chilled water circuit of the site. The bubble was stabilized in the calibration basket. The bubble then entered the collapsing frame. The flat tube leaving the collapsing frame passed immediately through the nip rolls that squeeze the film flat. The film was then guided over several idler rollers to the web center table, for web alignment. From here it went through the corona treating station to the Filmatic™ K contact winder. The blow up ratio (BUR) for the blown films was 2.5, and a die gap of 1.5 mm. The measured properties of the films for the first experiment are in Table 4; each run formed a film having a skin layer A, middle layer B and a skin layer C, 1/8/1. The values in Table 4 are an average value of five (5) measurements, and the value in the denominator is the standard deviation.

Test Methods:
Elongation at break, tensile strength at break and 1% secant modulus were determined according to ASTM D-882 by using an Instron testing machine.
Static and kinetic Coefficient of Friction (COF) was determined substantially in accordance with ASTM D1894. COF of film against film was measured with a 200 g weight at 150 mm/min for 150 mm length.
Melt Index ($I_2$): ISO 1133, 190° C., 2.16 kg., except for hPP, where testing temperature is set at 230° C.

Hysteresis Properties are measured with an Instron testing machine, following an internal ExxonMobil test method. Sample is 15 mm wide and distance between clamps is 50 mm. Test speed is 500 mm/min. Film is elongated MD or TD (machine direction or transverse) to 200%, then tension is released to 0% elongation after 10 sec. waiting time. Sample is re-stretched until tensile force reaches 0.1N and permanent set is measured as the elongation at this point and reported as % relative to the initial sample length. Tension is again released to 0% elongation, sample is re-clamped to eliminate the "over-length" and hysteresis is measured in the same way on the pre-stretched sample.

Puncture Force and Puncture Energy at break are measured with an Instron testing machine, following an internal ExxonMobil test method. A piston with a standard probe fixed to the load cell is pushed through a film sample in a circular sample holder up to break. The probe is hemispherical and made of stainless steel (high polish); probe diameter is 20 mm. Testing speed is 500 mm/min. Reported are force and energy at break. Force at Break: This is the force at the breakpoint of the film sample (when the probe has fully penetrated the film sample) and is expressed in Newtons or normalized for film sample thickness (N/mm or N/μm). Energy to break: This is the area under the force-displacement curve (integration) at the breakpoint and is expressed in mJ or normalized for film sample thickness (mJ/μm).

TABLE 1

Film Components for First Experiment

| Component | $I_2$, g/10 min (2.16 kg) | Density g/cm³ | Comments |
|---|---|---|---|
| αPP-A | 1.3 (@190° C.) | 0.855 | 16 wt % ethylene copolymer |
| αPP-B | 4.0 (@190° C.) | 0.871 | 11 wt % ethylene copolymer |
| hPP | 2.9 (@230° C.) | 0.910 | OPP grade homopolymer |
| LDPE | 0.75 (@190° C.) | 0.923 | blown film grade LDPE |
| EVA | 0.37 (@190° C.) | 0.941 | 18% VA blown film grade EVA |
| S-A masterbatch | αPP-B/Antiblock/slip-agent = 65/30/5 | | |
| TPV | Santoprene ™ 8201-80 (ExxonMobil Chemical Co.) | | |

TABLE 2

Film Structures A-G

| Sample | Skin Layer A | Middle Layer B | Skin Layer C | Remarks |
|---|---|---|---|---|
| A | αPP-B/S-A/LDPE 80/10/10 | αPP-A/hPP 95/5 | LDPE | transition sample; 15/40/15 μm |
| B | αPP-B/S-A/LDPE 70/20/10 | αPP-A | αPP-B/S-A/LDPE 70/20/10 | transition sample; +/−150 μm |
| C | αPP-B/S-A/LDPE 50/10/40 | αPP-A/EVA 70/30 | αPP-B/S-A/LDPE 50/10/40 | transition sample; +/−100 μm - 1/8/1 |
| D | αPP-B/S-A/EVA 60/10/30 | αPP-A/EVA 70/30 | αPP-B/S-A/EVA 60/10/30 | roll sample; 100 μm - 1/8/1 |
| E | αPP-A/S-A/EVA 60/10/30 | αPP-A/EVA 70/30 | αPP-A/S-A/EVA 60/10/30 | roll sample; 100 μm - 1/8/1 |
| F | αPP-A/S-A/EVA 55/15/30 | αPP-A/EVA 85/15 | αPP-A/S-A/EVA 55/15/30 | roll sample; 100 μm - 1/8/1 |
| G | αPP-A/TPV 40/60 | αPP-A/EVA 80/20 | αPP-A/TPV 40/60 | roll sample; 100 μm - 1/8/1 |

TABLE 3

Extrusion Settings for Sample Compositions D-G

| Parameter | D | E | F | G |
|---|---|---|---|---|
| Outer Skin Layer | | | | |
| Extruder speed, rpm | 27 | 25 | 25 | 31 |
| Output, kg/h | 27 | 24 | 24 | 25 |
| Melt temp, °C. | 176 | 177 | 177 | 223 |
| Melt pressure, bar | 190 | 250 | 251 | 167 |
| Layer thickness, μm | 11 | 10 | 11 | 10 |
| Extruder temp, setpoint, °C. | 170 | 170 | 170 | 220 |
| Middle Layer | | | | |
| Extruder speed, rpm | 41 | 45 | 45 | 48 |
| Output, kg/h | 63 | 73 | 65 | 72 |
| Melt temp, °C. | 217 | 219 | 221 | 201 |
| Melt pressure, bar | 208 | 213 | 216 | 210 |
| Layer thickness, μm | 26 | 30 | 29 | 31 |
| Extruder temp, setpoint, °C. | 200 | 200 | 200 | 170 |
| Inner Skin Layer | | | | |
| Extruder speed, rpm | 68 | 50 | 50 | 50 |
| Output, kg/h | 33 | 24 | 23 | 23 |
| Melt temp, °C. | 215 | 210 | 210 | 184 |
| Melt pressure, bar | 228 | 217 | 219 | 219 |
| Layer thickness, μm | 13 | 10 | 10 | 10 |
| Extruder temp, setpoint, °C. | 200 | 200 | 200 | 170 |
| Die Temp., °C. | 170 | 170 | 170 | 190 |

TABLE 4

Film Properties from Sample Compositions A-G

| Avg. Value/Standard Deviation | A | B | C | D | E | F | G |
|---|---|---|---|---|---|---|---|
| COF (static) | 0.74/0.08 | 0.21/0.01 | 0.24/0 | 0.24/0 | 0.43/0.04 | 0.28/0.05 | 3.24/0.35 |
| COF (kinetic) | 0.61/0.12 | 0.20/0.01 | 0.21/0.01 | 0.23/0.02 | 0.4/0.02 | 0.28/0.06 | 4.17/0.28 |
| Puncture energy at maximum force, mJ/μm | 74/4 | 20/5 | 47/10 | 105/8 | 117/6 | 18/1 | 35/1 |
| Puncture force at break, N/μm | 1.14/0.04 | 0.30/0.01 | 0.41/0.01 | 0.62/0.13 | 1.14/0.04 | 0.34/0.01 | 0.39/0.01 |
| Puncture energy at break, mJ/μm | 74/4 | 30/6 | 64/11 | 149/8 | 124/10 | 27/2 | 52/2 |
| Haze | 13.7/0.8 | 61.2/2.9 | 46.6/1.1 | 30/0.2 | 23.2/2.4 | 26/1.9 | 83.0/0.02 |
| Gloss | 37.5/5.2 | 11.2/1.3 | 17.3/0.7 | 24.6/3.2 | 39.4/1.5 | 38.2/1.5 | 7.1/0.2 |
| Tensile at 23° C., TD | | | | | | | |
| Thickness (μm) | 107/1 | 124/2 | 103/1 | 98/1 | 100/1 | 89.1/1 | 99/1 |
| Tensile strength at break (MPa) | 18.5/1.6 | 16.6/0.2 | 24.2/2.5 | 24.9/1.2 | 22.8/2.6 | 22.4/1.6 | 21.4/1.6 |
| Elongation at break, % | 680/32 | 834/5 | 787/36 | 769/9 | 760/29 | 777/16 | 828/20 |
| 1% Modulus (MPa) | 105/1 | 28/1 | 33/0 | 23/0 | 18/0 | 15/0 | 16/0 |
| Tensile at 23° C., MD | | | | | | | |
| Thickness (μm) | 109/1 | 136/4 | 103/1 | 96/1 | 99/2 | 90/1 | 98/2 |
| Tensile strength at break (MPa) | 13.3/1.3 | 17.1/1.5 | 20.9/1.7 | 22.8/1 | 22.6/1.2 | 21.2/2.9 | 19.9/0.4 |
| Elongation at break, % | 421/32 | 502/12 | 683/47 | 613/34 | 645/18 | 682/63 | 731/28 |
| 1% Modulus (MPa) | 85/2 | 24/1 | 30/0 | 25/0 | 18/0 | 16/1 | 16/0 |
| Hysteresis Properties (200% Deformation) | | | | | | | |
| TD | | | | | | | |
| Permanent set after Elongation to 200% (%) | 132 | 48 | 48 | 48 | 40 | 32 | 32 |
| Set after 2$^{nd}$ stretch (%) | 60 | 20 | 40 | 24 | 24 | 12 | 28 |
| MD | | | | | | | |
| Permanent set after Elongation 200% (%) | 160 | 36 | 68 | 76 | 68 | 44 | 48 |
| Set after 2$^{nd}$ stretch (%) | 44 | 16 | 48 | 32 | 36 | 16 | 28 |

The second set of experiments was conducted using the components described in Table 5. The propylene-α-olefin copolymers are labeled αPP-C, αPP-B (same as above in first experiment) and αPP-D and described in Table 5. Exact™ 5171 is an ethylene-1-octene copolymer (ExxonMobil Chemical Co.). The ethylene-ester copolymer ("EVA") is Escorene™ Ultra FL00018 (ExxonMobil Chemical Co.) polyethylene vinyl acetate copolymer, 18 wt % vinyl acetate. The "S-A" masterbatch is a mixture comprising αPP-B, antiblock agent, and slip agent in a ratio of 65/30/5, respectively; the antiblock agent was Sibelite™ M4000 (Sibelco), a high purity silca. The slip agent in the masterbatch was Crodamide VRX (Croda), an oleamide.

The components of the masterbatch were combined by a 35 mm Leistritz twinscrew extruder, independent of film extrusion. The melt temperature at the die was about 120° C., the temperature along the barrel ranged from 80 to 120° C.; the melt pressure at the die was about 118 bar, 230 rpm screw speed and 15 kg/hr feed rate.

Table 6 lists the film structures made from the Sample compositions H, I and J, with the relative amounts of each component in each sample composition. The Samples H, I and J are the inventive examples, having a total film thickness of 100 μm. A Sano 3-layer blown line, similar in size and working principles to the W&H described above, was used. The Sano line was equipped with 2 extruders and incumbent film structures were extruded in AAB=1/1/8 configuration (equivalent to A/B=1/4) with bubble collapsing (lamination at the bubble nip point) resulting in a AAB/BAA=A/B/A=1/8/1 film structure. Extruders of layer A and B respectively, have a smooth bore and 2.5" and 3.5" screw diameter with L/D=24. The die diameter was 10". The blow up ratio (BUR) for the blown films in experiment 2 was 2.5, and a die gap of 2.3 mm or 90 mil. The target film thickness was 100 μm or 3.9 mil. Extruders were run under the following conditions:

B layer: 3.5 inch extruder: melt temperature was 185° C., die pressure was 2800 psi.

A layer: 2.5 inch extruder: melt temperature was 162° C., die pressure was 2900 psi.

haul-off speed and extrusion output were adjusted to get the desired film structure and maintain good bubble stability.

The measured properties of the films for the second experiment are in Table 7. The values in Table 7 are an average value of 5 measurements, and the value in the denominator is the standard deviation.

TABLE 5

Film Components for Second Experiment

| Component | $I_2$, g/10 min (2.16 kg) | Density g/cm³ | Comments |
|---|---|---|---|
| αPP-C | 1.3 (@190° C.) | 0.855 | 16 wt % ethylene copolymer |
| αPP-B | 4.0 (@190° C.) | 0.871 | 11 wt % ethylene copolymer |
| αPP-D | 0.9 (@190° C.) | 0.871 | 11 wt % ethylene copolymer |
| Exact ™ 5171 | 1 (@190° C.) | 0.870 | Ethylene-1-octene copolymer |
| EVA | 0.37 (@190° C.) | 0.941 | 18% VA blown film grade EVA |
| S-A masterbatch | αPP-B/antiblock/slip = 65/30/5 | | |

TABLE 6

Film Structures H, I and J from Second Experiment

| Sample (relative amount) | 2.5" Extruder (A) layer | 3.5" Extruder (B) layer |
|---|---|---|
| H | αPP-B/EVA/S-A 60/30/10 | αPP-C/EVA 70/30 |
| I | αPP-D/EVA/S-A 60/30/10 | αPP-C/EVA 70/30 |
| J | Exact/EVA/S-A 60/30/10 | αPP-C/EVA 70/30 |

TABLE 7

Film Properties from Sample Compositions H, I and J

| | Avg. Value/Standard Deviation | | |
|---|---|---|---|
| | H | I | J |
| COF (static) | 0.23/0.02 | 0.18/0 | 0.14/0.01 |
| COF (kinetic) | 0.22/0.01 | 0.17/0.01 | 0.13/0.01 |
| Haze | 41/2 | 25/2 | 29/1 |
| Gloss | 21.8/1.1 | 34.4/1.9 | 38.6/1.6 |
| Tensile at 23° C., TD | | | |
| Tensile at break (MPa) | 26.3/1.2 | 26.0/0.9 | 26.5/0.7 |
| Elongation at break, % | 669/39 | 601/24 | 647/8 |
| 1% Modulus (MPa) | 23/1 | 26/4 | 20/2 |
| Tensile at 23° C., MD | | | |
| Tensile at break (MPa) | 26.2/0.2 | 24.1/0.4 | 24.0/0.4 |
| Elongation at break, % | 846/12 | 777/7 | 776/5 |
| 1% Modulus (MPa) | 24/1 | 28/2 | 22/1 |
| Hysteresis Properties (200% Deformation) MD | | | |
| Permanent set after Elongation to 200% (%) | 46.4 | 56.4 | 47.2 |
| Set after 2$^{nd}$ stretch (%) | 37.6 | 52 | 40.4 |
| TD | | | |
| Permanent set after Elongation to 200% (%) | 30.2 | 37.6 | 32.2 |
| Set after 2$^{nd}$ stretch (%) | 30.8 | 44.6 | 33.8 |

Having described the invention(s) in its various aspects, a first (1) embodiment is a composition comprising: (a) one or more propylene-α-olefin copolymer comprising propylene-derived units and from 5 to 35 wt % (by weight of the propylene-α-olefin copolymer) of ethylene-derived units and/or $C_4$ to $C_{10}$ α-olefin-derived units, and having a Mooney viscosity [ML (1+4) @ 125° C.] as determined according to ASTM D1646, of less than 50, and a $H_f$ of less than 75 J/g; and (b) one or more ethylene-ester copolymer.

2. The composition of embodiment 1, wherein the one or more propylene-α-olefin copolymer(s) is present in an amount of from 50 to 95 wt % by weight of the propylene-α-olefin copolymer and ethylene-ester copolymer.

3. The composition of embodiments 1 and 2, wherein the one or more propylene-α-olefin copolymer has a comonomer content within the range of from 2 to 20 wt % based on the weight of the propylene-α-olefin copolymer.

4. The composition of any of the previous numbered embodiments, wherein the one or more propylene-α-olefin copolymer has a percent crystallinity within the range of from 0.5 to 40%.

5. The composition of any of the previous numbered embodiments, wherein the one or more propylene-α-olefin copolymer has a Mooney viscosity [ML (1+4) @ 125° C.] as determined according to ASTM D1646, of less than 30.

6. The composition of any of the previous numbered embodiments, wherein the one or more propylene-α-olefin copolymer possesses an Elongation at Break of less than 1000%.

7. The composition of any of the previous numbered embodiments, wherein the one or more ethylene-ester copolymer has a melt index (190° C./2.16 kg) within the range of from 0.05 to 10 dg/min.

8. The composition of any of the previous numbered embodiments, wherein the one or more ethylene-ester copolymer has an ester-derived content within the range of from 5 to 30 wt % by weight of the ethylene-ester copolymer.

9. The composition of any of the previous numbered embodiments, wherein the ethylene-ester copolymer comprises ester-derived groups selected from structures $CH_2CR^1(R^2)$, wherein $R^1$ is selected from hydrogen and $C_1$ to $C_{10}$ alkyls; and $R^2$ is selected from —$OCCR^3$ groups and —$COOR^3$ groups; and wherein $R^3$ is selected from hydrogen and $C_1$ to $C_{10}$ alkyls.

10. The composition of any of the previous numbered embodiments, also comprising from 0.1 to 20 wt % of an anti-blocking agent, by weight of the composition.

11. The composition of embodiment 10, wherein the anti-blocking agent is an inorganic mineral.

12. The composition of embodiment 10, also comprising from 0.05 to 10 wt % of a slip agent, by weight of the composition.

13. The composition of embodiment 12, wherein the slip agent is an organic amide.

14. The composition of embodiment 12, wherein the composition consists essentially of components (a) and (b), the anti-blocking agent and the slip agent.

15. A film comprising the composition of any of the previous numbered embodiments.

16. A film comprising the composition of embodiment 12.

17. A film comprising one or more skin layer comprising the composition of embodiment 12, wherein the film also comprises one or more middle layer comprising: (a) one or more propylene-α-olefin copolymer comprising propylene-derived units and from 5 to 35 wt % (by weight of the propylene-α-olefin copolymer) of ethylene-derived units and/or $C_4$ to $C_{10}$ α-olefin-derived units, and having a Mooney viscosity [ML (1+4) @ 125° C.] as determined according to ASTM D1646, of less than 50, and a $T_m$ of less than 105° C.; and (b) one or more ethylene-ester copolymer.

18. The film of embodiment 17, wherein the film comprises at least two skin layers and one or more middle layer there between.

19. The film of embodiment 17, possessing a Permanent Set after Elongation to 200%, TD, of less than 60%.

20. The film of embodiments 17-19, possessing a static coefficient of friction of less than 0.40.

21. The film of any of the previous numbered embodiments 15-20, wherein the film is a blown film.

The invention also includes the use of a film in an article of manufacture, wherein the film comprises one or more layer comprising: (a) one or more propylene-α-olefin copolymer(s) comprising propylene-derived units and from 5 to 35 wt % (by weight of the propylene-α-olefin copolymer) of ethylene-derived units and/or $C_4$ to $C_{10}$ α-olefin-derived units, and having a Mooney viscosity [ML (1+4) @ 125° C.] as determined according to ASTM D1646, of less than 50, and a $H_f$ of less than 75 J/g; and (b) one or more ethylene-ester copolymer(s).

The invention also includes the use of composition in a film of one or more layer, wherein the composition comprises: (a) one or more propylene-α-olefin copolymer(s) comprising propylene-derived units and from 5 to 35 wt % (by weight of the propylene-α-olefin copolymer) of ethylene-derived units and/or $C_4$ to $C_{10}$ α-olefin-derived units, and having a Mooney viscosity [ML (1+4) @ 125° C.] as determined according to ASTM D1646, of less than 50, and a $H_f$ of less than 75 J/g; and (b) one or more ethylene-ester copolymer(s). In one embodiment, the composition also comprises an anti-blocking agent and a slip agent. In yet another embodiment, the composition consists essentially of components (a), (b), the anti-block agent and the anti-slip agent.

The invention claimed is:

1. A film comprising a composition comprising
   (a) one or more propylene-α-olefin copolymer(s) comprising propylene-derived units and from 5 to 35 wt % (by weight of the propylene-α-olefin copolymer) of ethylene-derived units and/or $C_4$ to $C_{10}$ α-olefin-derived units, and having a Mooney viscosity [ML (1+4) @ 125° C.] as determined according to ASTM D1646, of less than 50, a $H_f$ of less than 75 J/g, and a triad tacticity of three propylene units of at least 75%; and
   (b) one or more ethylene-ester copolymer(s).

2. The film of claim 1, wherein the one or more propylene-α-olefin copolymer(s) is present in an amount of from 50 to 95 wt % by weight of the propylene-α-olefin copolymer(s) and ethylene-ester copolymer(s).

3. The film of claim 1, wherein the one or more propylene-α-olefin copolymer(s) has a comonomer content within the range of from 5 to 20 wt % based on the weight of the propylene-α-olefin copolymer(s).

4. The film of claim 1, wherein the one or more propylene-α-olefin copolymer(s) has a percent crystallinity within the range of from 0.5 to 40%.

5. The film of claim 1, wherein the one or more propylene-α-olefin copolymer(s) has a Mooney viscosity [ML (1+4) @ 125° C.] as determined according to ASTM D1646, of less than 30.

6. The film of claim 1, wherein the one or more propylene-α-olefin copolymer(s) possesses an Elongation at Break of less than 1000%.

7. The film of claim 1, wherein the one or more ethylene-ester copolymer(s) has a melt index (190° C./2.16 kg) within the range of from 0.05 to 10 dg/min.

8. The film of claim 1, wherein the one or more ethylene-ester copolymer(s) has an ester-derived content within the range of from 5 to 30 wt % by weight of the ethylene-ester copolymer(s).

9. The film of claim 1, wherein the ethylene-ester copolymer(s) comprise ester-derived groups selected from structures $CH_2CR^1(R^2)$, wherein $R^1$ is selected from hydrogen and $C_1$ to $C_{10}$ alkyls; and $R^2$ is selected from —$OOCR^3$ groups and —$COOR^3$ groups; and wherein $R^3$ is selected from hydrogen and $C_1$ to $C_{10}$ alkyls.

10. The film of claim 1, also comprising from 0.1 to 20 wt % of one or more anti-blocking agent(s), by weight of the composition.

11. The film of claim 10, wherein the anti-blocking agent is an inorganic mineral.

12. The film of claim 10, also comprising from 0.05 to 10 wt % of one or more slip agent(s), by weight of the composition.

13. The film of claim 1 further comprising from 0.1 to 20 wt % of one or more anti-blocking agent(s) and from 0.05 to 10 wt % of one or more slip agent(s), by weight of the composition.

14. The film of claim 13, wherein the composition consists essentially of components (a) and (b), the anti-blocking agent(s) and the slip agent(s).

15. The film of claim 1, wherein the film is a blown film.

16. A film comprising one or more skin layer comprising the composition of claim 13, wherein the film also comprises one or more middle layer comprising:
   (a) one or more propylene-α-olefin copolymer(s) comprising propylene-derived units and from 5 to 35 wt % (by weight of the propylene-α-olefin copolymer) of ethylene-derived units and/or $C_4$ to $C_{10}$ α-olefin-derived units, and having a Mooney viscosity [ML (1+4) @ 125° C.] as determined according to ASTM D1646, of less than 50, and a $T_m$ of less than 105° C.; and
   (b) one or more ethylene-ester copolymer(s).

17. The film of claim 16, wherein the film comprises at least two skin layers and one or more middle layer there between.

18. The film of claim 16, possessing a Permanent Set after Elongation to 200%, TD, of less than 60%.

19. The film of claim 16, possessing a static coefficient of friction of less than 0.40.

20. A film comprising one or more skin layer and a middle layer, wherein:
   (a) the one or more skin layer comprises:
      (i) propylene-α-olefin copolymer(s) comprising propylene-derived units and from 5 to 35 wt % (by weight of the propylene-α-olefin copolymer) of ethylene-derived units and/or $C_4$ to $C_{10}$ α-olefin-derived units, and having a Mooney viscosity [ML (1+4) @ 125° C.] as determined according to ASTM D1646, of less than 50, a $H_f$ of less than 75 J/g, and a triad tacticity of three propylene units of at least 75%;
      (ii) one or more ethylene-ester copolymer(s);
      (iii) one or more anti-block agent(s);
      (iv) one or more slip agent(s); and
   (b) the middle layer comprises:
      (i) one or more propylene-α-olefin copolymer(s) comprising propylene-derived units and from 5 to 35 wt % (by weight of the propylene-α-olefin copolymer) of ethylene-derived units and/or $C_4$ to $C_{10}$ α-olefin-derived units, and having a Mooney viscosity [ML (1+4) @ 125° C.] as determined according to ASTM D1646, of less than 50, a $H_f$ of less than 75 J/g, and a triad tacticity of three propylene units of at least 75%; and (ii) one or more ethylene-ester copolymer(s).

21. The film of claim 20, wherein the layer(s) (a) consist essentially of components (i), (ii), (iii), and (iv).

22. The film of claim 20, wherein the layer(s) (b) consists essentially of components (i) and (ii).

23. A process for making a film comprising:
(a) melt blending one or more propylene-α-olefin copolymer comprising propylene-derived units and from 5 to 35 wt % (by weight of the propylene-α-olefin copolymer) of ethylene-derived units and/or $C_4$ to $C_{10}$ α-olefin-derived units, and having a Mooney viscosity [ML (1+4) @ 125° C.] as determined according to ASTM D1646, of less than 50, a $H_f$ of less than 75 J/g, and a triad tacticity of three propylene units of at least 75%; and one more ethylene-ester copolymer; and
(b) extruding the intimately blended melt through one or more die having one or more die gap within the range of from 0.8 to 3 mm.

* * * * *

UNITED STATES PATENT AND TRADEMARK OFFICE
CERTIFICATE OF CORRECTION

PATENT NO.        : 8,709,608 B2                                              Page 1 of 1
APPLICATION NO.  : 12/809529
DATED             : April 29, 2014
INVENTOR(S)       : Hans J. Pip It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 812 days.

Signed and Sealed this

Twenty-ninth Day of September, 2015

Michelle K. Lee
*Director of the United States Patent and Trademark Office*